(12) United States Patent
Allen et al.

(10) Patent No.: US 10,459,330 B2
(45) Date of Patent: Oct. 29, 2019

(54) HYBRID NANOCOMPOSITE MATERIALS, LASER SCANNING SYSTEM AND USE THEREOF IN VOLUMETRIC IMAGE PROJECTION

(71) Applicant: PRODUCTION ELEKTRATEK INC., Montreal, Quebec (CA)

(72) Inventors: Claudine Allen, Saint-Isidore (CA); Simon Thibault, Quebec (CA); Alicia Talbot-Lanciault, Quebec (CA); Philippe Blais, Quebec (CA); Guillaume St-Onge, Laurier-Station (CA); Pierre Desaulniers, Quebec (CA)

(73) Assignee: LUX IMAGE INC., Montreal (CA)

( * ) Notice: Subject to any disclaimer, the term of this patent is extended or adjusted under 35 U.S.C. 154(b) by 0 days.

(21) Appl. No.: 15/568,391

(22) PCT Filed: Apr. 21, 2016

(86) PCT No.: PCT/CA2016/050466
§ 371 (c)(1),
(2) Date: Oct. 20, 2017

(87) PCT Pub. No.: WO2016/168936
PCT Pub. Date: Oct. 27, 2016

(65) Prior Publication Data
US 2018/0101091 A1    Apr. 12, 2018

(30) Foreign Application Priority Data

Apr. 21, 2015   (CA) ...................................... 2889103

(51) Int. Cl.
*G03B 21/56* (2006.01)
*C09K 11/02* (2006.01)
(Continued)

(52) U.S. Cl.
CPC .............. *G03B 35/18* (2013.01); *C09K 11/02* (2013.01); *G03B 21/204* (2013.01);
(Continued)

(58) Field of Classification Search
CPC .. G03B 21/567; G03B 21/204; G03B 21/206; G03B 21/608; G03B 21/60; G03B 21/62; C09K 11/02; H04N 9/3129
(Continued)

(56) References Cited

U.S. PATENT DOCUMENTS

| | | | |
|---|---|---|---|
| 6,897,999 B1* | 5/2005 | Bass | ...................... C09K 11/02 359/326 |
| 2004/0227694 A1* | 11/2004 | Sun | ........................ G09G 3/003 345/6 |
| 2012/0234460 A1 | 9/2012 | Zhang et al. | |

FOREIGN PATENT DOCUMENTS

| | | |
|---|---|---|
| EP | 2520636 | 11/2012 |
| WO | WO2007127214 | 11/2007 |

(Continued)

OTHER PUBLICATIONS

International Search Report, completion dated Jun. 13, 2016, issued in the corresponding patent application PCT/CA2016/050466 filed Apr. 21, 2016 in the name of Production Elektratek Inc.

*Primary Examiner* — Ryan D Howard
(74) *Attorney, Agent, or Firm* — Brouillette Legal Inc.; Robert Brouillette

(57) ABSTRACT

The invention relates essentially to the field of hybrid nanocomposite materials for uses in volumetric projection, for example such as in 3D imaging (such as the field of entertainment or the medical field). In particular, the invention describes a binary hybrid projection matrix, including at least two types of (nano)particles and/or different molecules (quantum dots, metal nanoparticles; carbon nanotubes), a method for manufacturing the matrix and a 3D projection (Continued)

system and method that includes the use of the matrix. The addition of the second type of particles makes it possible to modify the properties of the matrix in order to achieve better volumetric projection performance or else to generate new features that did not exist with a single particle. The new matrix also makes it possible to reduce the power of the laser used for the projection while obtaining equivalent brightness to that of existing matrices.

28 Claims, 9 Drawing Sheets

(51) Int. Cl.
*G03B 35/18* (2006.01)
*H04N 5/74* (2006.01)
*G03B 21/608* (2014.01)
*G03B 21/20* (2006.01)
*G03B 21/606* (2014.01)
*H04N 9/31* (2006.01)

(52) U.S. Cl.
CPC ......... *G03B 21/606* (2013.01); *G03B 21/608* (2013.01); *H04N 5/74* (2013.01); *H04N 9/3129* (2013.01)

(58) Field of Classification Search
USPC .................................................. 359/452, 453
See application file for complete search history.

(56) References Cited

FOREIGN PATENT DOCUMENTS

| WO | WO2014107425 | 7/2014 |
| WO | WO2014107426 | 7/2014 |

* cited by examiner (x) Position of the sample on the translation axis
(y) Average intensity of the light (x) Position of the sample on the translation axis
(y) Average intensity of the light (x) Position of the sample on the translation axis
(y) Average intensity of the light (x) Position of the sample on the translation axis
(y) Average intensity of the light

HYBRID NANOCOMPOSITE MATERIALS, LASER SCANNING SYSTEM AND USE THEREOF IN VOLUMETRIC IMAGE PROJECTION

REFERENCE TO PARENT APPLICATIONS

The present patent application claims the priority of the Canadian patent application no. 2,889,103, untitled "Hybrid Nanocomposite Materials And Their Use In A Volumetric Projection System", filed on Apr. 21, 2015 at the Canadian Intellectual Property Office. The content of this priority application is incorporated herein in its entirety by reference.

FIELD OF THE INVENTION

The present invention relates essentially to the field of nanocomposite materials and three-dimensional laser scanning for applications in volumetric or three-dimensional (3D) imaging. The invention is particularly suitable to the fields of computer aided design (CAD), entertainment or the medical field but is not limited to these fields.

HISTORY OF THE INVENTION

Today's technology makes it possible to synthesize more complex materials and better adapted to experimental and industrial needs. By having an accurate list of desired characteristics, the material can be manufactured to fully fulfill the function for which it is intended. Optics is one of the fields where the science of materials makes possible several experimental and theoretical advances.

The quantum dots are semiconductor nanostructures. The particularity of these nanostructures is always to re-transmit the absorbed energy at the same frequency. When a semiconductor absorbs energy, one or more electrons move towards the conduction band, leaving one or more holes in the valence band. The electron and the hole remain bound by an electric force and form an exciton. The quantum dots, by their crystalline nature, confines the excitons over a few nanometers in the three dimensions as if they were caught in a box. Since only the integer multiples of the wavelengths are allowed in the box of fixed dimensions, the energy levels are discretized. It is the size of the quantum dot that determines the emission wavelength of the quantum dot. The more a quantum dot has a large radius, the shorter its emission wavelength. For example, red quantum dots have a larger size than blue quantum dots. When excited by an energy source, one of their electrons rises to the conduction band and then relaxes and falls back into the valence band. A photon is then emitted by fluorescence.

The linear absorption followed by fluorescence can be described by an object that receives energy, mainly electrical or luminous, and appropriates it. This object, more energetic than before, is found in an excited state with a surplus of energy. In order to relax and fall back to a lower energy, the object, if it is fluorescence, can emit a photon of precise wavelength. Quantum dots are fluorescence objects that can absorb light energy within a certain frequency range and re-emit it at a natural frequency.

The quantum dots are used by several researchers for various applications. Their synthesis and properties are well documented (REISS, Peter, et al., 2009, "Core/Shell Semiconductor Nanocrystals", Small, Volume 5, Issue 2, pages 154-168). Moreover, quantum dots have already been dispersed in a matrix of polymethylmethacrylate (PMMA), but only for photovoltaic applications (KLEVIOV, Victor 1. and MEINARDI, Francesco: *Large-area luminescent solar concentrators based on Stokes—PMMA matrix*, Nature Photonics, 8, 392-399 (2014)) in order to produce more efficient solar panels. Finally, the two-photon absorption of quantum dots has been demonstrated experimentally (KARABULUT, Ibrahim and BASKOUTAS, Sotirios: *Linear and nonlinear optical absorption coefficients and refractive indexes in spherical quantum dots Intensity*, Journal of Applied Physics, 103, 2008). The Z-Scan technique has been developed to characterize non-linear absorption (VAN STRYLAND, Eric W. and SHEIK-BAHAE, Mansoor, *Z-Scan Measurements of Optical Nonlinearities,—*692).

U.S. Pat. No. 7,858,913 B2 (Refai et al., 2010) discloses a light surface display device for obtaining a three-dimensional image which comprises a plurality of particles suspended in a volumetric display device. A first projection system projects sequential wafers of electromagnetic energy of one or more wavelengths along the length and width of the volumetric display device, thereby exciting particles so as to form a two-dimensional image. A second projection system projects translational slices of electromagnetic energy of one or more wavelengths that intersect the excited particles across the thickness of the volumetric display. A control system synchronizes the projection of the image source and the activation source so that the two-dimensional image and the translational slices excite the particles for a predetermined period of time, thereby enabling said particles to illuminate to form an illuminated three-dimensional image. The invention described in this patent requires the use of two projection systems in order to be able to produce the three-dimensional image.

Other known volumetric projection systems are disclosed in U.S. Patent Applications Nos. US 2013/0314416 A1 (Kuhlman et al., 2013) and US 2014/0327747 A1 (Kong, 2014).

The current systems of transparent matrices doped with nano-emitters, such as quantum dots or nano-crystals, have a response to the photonic excitation too low to allow the use of these matrices in 3D volumetric projection systems. There is therefore a need for a novel type of matrix of nanocomposite materials whose response to photonic excitation will be sufficiently powerful to permit its use in such volumetric projection systems.

SUMMARY OF THE INVENTION

The invention relates firstly to a hybrid projection matrix for volumetric three-dimensional (3D) imaging projection, the matrix comprising in a solid support transparent to light a synergistic combination of at least two different types of particles:

a first type comprising nano-emitting particles adapted to non-linearly absorb one or two photons and emit visible light; and a second type consisting of at least one additive enhancing the non-linear absorption to one or two photons and the emission of light visible by the nano-emitting particles, thus making it possible to intensify and/or modify the light emitted by the nano-emitting particles.

The invention also relates to a process for making a hybrid projection matrix for volumetric three-dimensional (3D) imaging projection, the process comprising the following steps:

a) mixing in a solution allowing the synthesis of a support transparent to light, a first given amount of a first type of particles comprising nano-emitting particles and a second given quantity of a second type of particle consisting of at least one additive; and b) solidifying the mixture obtained to obtain the matrix.

The invention also relates to a three-dimensional (3D) imaging volumetric projection system, the system comprising:

a photon emitting source; and the hybrid projection matrix as defined herein, the matrix being located downstream of the emitting source in order to receive the photons from the emitting source, the matrix then emitting visible light in order to create a three-dimensional image.

The invention also relates to a method for volumetric projection of three-dimensional (3D) imaging, the method consisting in projecting photons on the hybrid projection matrix as defined herein, the matrix then emitting visible light to form an image in three dimensions.

The invention also relates to the use of the hybrid projection matrix as defined herein, in order to form a three-dimensional image.

The invention is not limited to the number of particle types used in the matrix, and one could generalize by adding a third, fourth, fifth, . . . n-th type of particles to produce tertiary, quaternary, etc. hybrid matrices.

The aim of introducing the second type of particles or additives is to modify the properties of the matrix containing the original single type of particles in order to achieve better performances of sparse projection or to generate new characteristics that did not exist to a single particle. The invention also makes it possible to measure the non-linear absorption of the quantum dots in a plastic matrix and to check the impact of an additive addition on the phenomenon.

According to a preferred embodiment of the invention, quantum dots are the structures chosen to produce the desired non-linear effect in the optical material (matrix). They are preferably retained by plastic so that they can be used in a practical context and limit their harmful effects on health.

Moreover, unlike the current systems of transparent matrices doped with nano-emitters, such as quantum dots or nano-crystals, which have a response to the photonic excitation too low to allow the use of these dies in of 3D spanned volumetric projection systems, the response to photonic excitation by the present invention is sufficiently powerful to permit its use in such volumetric projection systems. In addition, this makes it possible to reduce in the projection system the power of the photon-emitting source, such as a laser, while obtaining a visible image in the matrix, thus making it possible to preserve the plastic matrix, it does not melt under the effect of the photon or laser beam.

The optical phenomena involved in the present invention preferentially focus on the absorption to one or two photons, more preferably two photons, and the emission of the energy by fluorescence. The two-photon absorption followed by fluorescence makes it possible to obtain a visible emission wavelength even when the quantum dots are excited by means of infrared light. This makes it possible to exploit this phenomenon in order to manufacture volumetric projection screens. Preferably, this technology uses an invisible incident signal for human eyes so as not to alter the presented image. When the quantum dot receives the signal, two infrared photons, it re-emits its energy in a single visible photon, thus creating an image that can be in three dimensions.

The present invention differs preferentially insofar as it proposes to combine these aspects, placing the quantum dots preferably in a plastic material, such as PMMA but not limited to this material, in order to characterize their non-linear absorption by means of d a Z-Scan laser.

The present invention paves the way for new possibilities of functionality in addition to aiming to enhance and improve all the optical properties (life time either the "speed" of light emission, colorimetric quality, "absorption quantity", etc.) materials that contain only nanoemitters.

The features of the present invention which are considered to be novel and inventive will be described in greater detail in the claims set forth hereinafter.

BRIEF DESCRIPTION OF THE DRAWINGS

The advantages, objects and characteristics of the present invention will be more readily apparent with reference to the following detailed description which will be made with reference to the figures in which.

DESCRIPTION OF CERTAIN PREFERENTIAL ELEMENTS OF THE INVENTION

Figure 1:
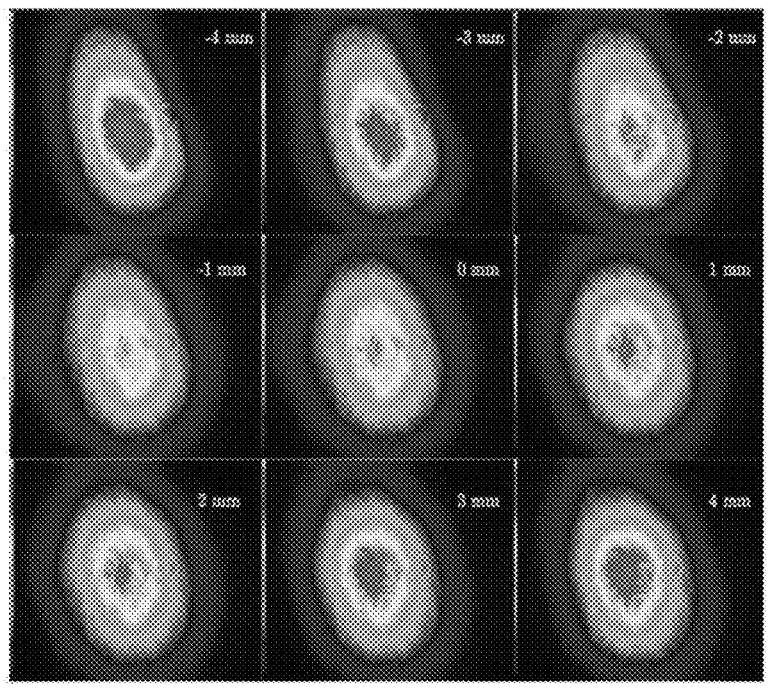
FIG. 1 represents the distance of the beam from the detector with respect to the position of the sample. The inscribed distances are measured approximately relative to the focal point of the laser. A weaker presence of red color means less intensity of light, suggesting absorption.
Figure 2:
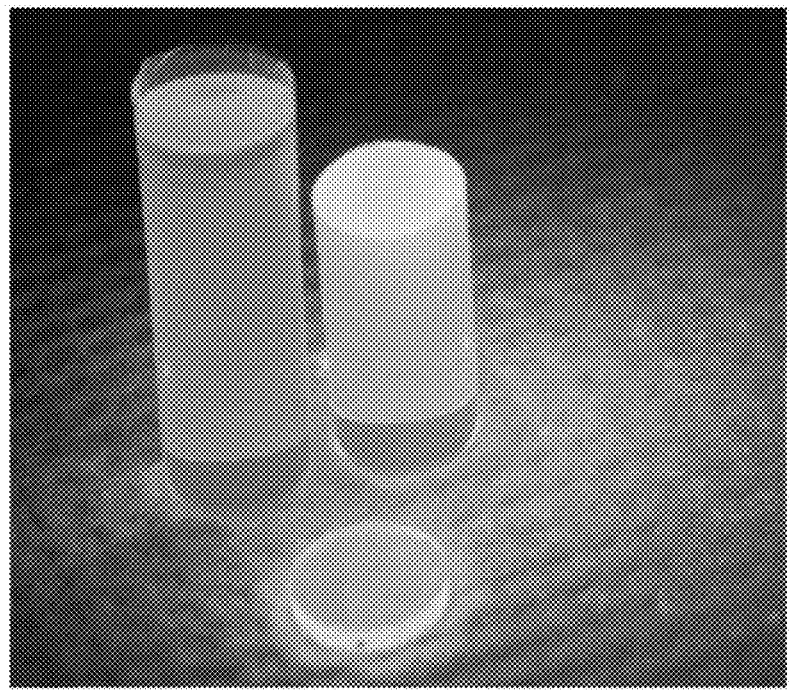
FIG. 2 shows cylindrical samples under ultraviolet light. The circular blade is cut from the cylinders and polished.

According to a first preferred embodiment, the invention consists of a hybrid projection matrix for volumetric projection of three-dimensional (3D) imagery. The matrix comprises in a solid support transparent to light a synergistic combination of at least two different types of particles:

a first type comprising nano-emitting particles adapted to absorb in a non-linear manner one or two photons and emit visible light; and a second type comprising at least one additive enhancing the non-linear absorption to one or two photons and the emission of light visible by the nano-emitting particles, thus making it possible to intensify and/or modify the light emitted by the nano-emitting particles.

The matrix is preferably a matrix in which the solid support transparent to light comprises a polymeric support, such as, for example, polymethylmethacrylate (PMMA). It is understood that other polymeric materials forming light transparent structures could be used in the invention.

Preferably, the nano-emitting particles comprise quantum dots, quantum wires or rods, quantum wells, quantum rings, nanocrystals such as core/shell nanocrystals or heterostructured nanocrystals, nanoplates, fluorescent molecules, fluorophores, and/or phosphors. More preferably, the nano-emitting particles comprise quantum dots.

Metallic nanoparticles are more preferably silver nanoparticles or carbon nanoparticles.

Preferably, the additive or additives used in the present invention comprise gold nanoparticles, silver nanoparticles, semiconductor nanoparticles, nanocellulose, carbon nanotubes, two-dimensional materials, graphene, or conductive polymers and/or semiconductors. More preferably, the additive or additives comprise metal particles which are silver nanoparticles and/or carbon nanotubes.

The matrix is preferably in the form of a sheet having a thickness of between 2 and 5 mm. The sheet preferably has a polished surface, with a finish of about 1 µm.

According to a second aspect, the invention relates to a process for producing a hybrid projection matrix for volumetric three-dimensional (3D) imaging projection, the process comprising the following steps:

a) mixing in a solution allowing the synthesis of a solid support transparent to light, a given first quantity of a first type of particles comprising nano-emitting particles and a second given quantity of a second type of particles consisting of at least one additive; and b) solidifying the obtained mixture to obtain the matrix.

Preferably, the solution allowing the synthesis of the solid support transparent to light comprises a monomer which, once polymerized, forms a polymeric support transparent to light. As mentioned above, the matrix is preferably a matrix in which the solid support transparent to light comprises a polymeric support, such as, for example, polymethylmethacrylate (PMMA). It is understood that other polymeric materials forming light transparent structures could be used in the invention.

According to a preferred embodiment, the process of manufacturing the hybrid projection matrix for the three-dimensional (3D) volumetric imaging projection comprises the following steps:

a1) mixing the monomer solution for synthesis of the polymeric support, the first given amount of the first type of particles comprising the nano-emitting particles and the second given quantity of the second type of particles comprising said at least one additive;

a2) inserting a polymerization initiator into the mixture; and b1) allowing the mixture obtained to polymerize to obtain the matrix.

The materials used in the process are as already described above.

Preferably, for a matrix based on quantum dots and metal particles (silver and/or carbon nanotubes), the process further comprises the step of preheating the mixture to a temperature of about 90° C. before the insertion of the initiator. The process may further comprise the steps of pouring the mixture into a shaped mold such as prisms or cylinders and allowing the mixture to polymerize at a temperature of about 75° C. for a period of about 24 hours.

The process may also comprise the step of cutting the matrix obtained after polymerization in the form of parallel strips. The process may further include the step of selecting adjacent slides to obtain similar concentrations of nanoparticles in each of the selected slides. The selected sheets preferably have a thickness between 2 mm and 5 mm.

The process may further comprise the step of polishing the sheet. The polished sheet preferably has a fineness of about 1 µm.

In the manufacturing process, the matrix preferably comprises a concentration of quantum dots between 2 µl/ml and 8 µl/ml, and a concentration of silver nanoparticles between 0.01 mg/ml and 0.2 mg/ml. The matrix may also include a concentration of quantitative points between 2 µl/ml and 8 µl/ml, and a concentration of carbon nanotubes between 0.0001 mg/ml and 0.01 mg/ml.

According to a third aspect, the invention consists of a three-dimensional (3D) imaging volumetric projection system. The system includes a photon emitting source, such as a laser; and the hybrid projection matrix as defined herein. The matrix is located downstream of the emitting source to receive the photons from the emitting source, the matrix then emitting visible light to create a three-dimensional image.

Preferably, the photon-emitting source is a laser which emits light, such as invisible infrared light (IR), UV light or visible light. Preferably, invisible IR light is used to attenuate interactions with the light emitted by the matrix.

The system may include a laser which produces an XY-scan to position a focal point of the beam for each transverse plane of an image. The scan produced may be a Z-scan to position a focal point of the beam for each depth plane of the image. The product scan can also be used to fill a voxel.

According to a preferred embodiment of the invention, the projection system comprises a laser which produces a decoupled scan in three parts making it possible to increase a total refresh rate of the system, the scanning comprising:

a first X-Y scan for positioning a focal point of the beam for each transverse plane of an image;

a second Z-scan for positioning a focal point of the beam for each depth plane of the image; and a third scan to complete an image and fill a voxel.

According to another aspect, the invention consists of a three-dimensional (3D) imaging volumetric projection process which consists in projecting photons onto the hybrid projection matrix as defined herein, the matrix then emitting visible light for forming a three-dimensional image.

The elements of the process are those already described herein.

Absorption with two photons and fluorescence: Plot the situation with an incident photon of frequency fi which would be absorbed by a quantum dot. The quantum dot would re-emit this energy into a photon of frequency fe, where, by conservation of energy, fi>fe. The energy difference is lost in heat. Let us imagine now that two photons of frequency f1 arrive at the same moment on the quantum dot and that they are both simultaneously absorbed. If 2f1>f2, where f2 is the emission frequency of the quantum dot, two-photon absorption occurs, followed potentially by fluorescence. For the phenomenon to take place, the incident photons do not have to be at the same frequency. However, the sum of their respective frequencies must be within the absorption range of the quantum dot or object being studied.

The purpose of the Z-Scan technique is to measure the non-linear refractive index and the non-linear absorption coefficient of an object.

In the context of the present invention, only the non-linear absorption has been studied qualitatively. The principle consists in moving the sample on either side of the focal point on the axis passing through the apexes of the light cones generated by the beam focusing (see FIG. 3). The intensity of the light that was not linearly absorbed in the vicinity of the focal dot is not collected at the end of the course. By plotting the light intensity graph collected as a function of the position of the sample along its path, a hollow is obtained which reaches its lowest point at the focal point.

Referring to FIG. 1, it is noted, approaching the focal point, that only the dark section at the center undergoes changes. This is an indication that it is indeed a two-photon absorption detectable by a Z-Scan. This phenomenon occurring at high intensity only (dark and white center sections), the peripheral sections of the light gray and black color images are not transformed by the movement of the sample.

Examples of Hybrid Matrices:

A novel binary hybrid projection matrix comprising at least two types of (nano)particles and/or different molecules will be described hereinafter. Even if the invention will be described by taking as an example one or more preferred embodiments, it is important to understand that these preferred embodiments are used to illustrate the invention and not to limit its scope.

Description of Fitting and Equipment

The first step of manufacturing is the molding of prisms or plastic cylinders. When the liquid mixture containing the methyl methacrylate, the quantum dots, the metal additions and the polymerization initiator is made, the pre-polymerization step can be started. For example, the temperature may be 90° C. The assembly necessary for its realization consists essentially of a heating plate resting on a universal support, a water bath filled with water placed on the plate, a thermometer indicating the temperature of the water and two clamps to support submerged samples. Following the preheating step, the blocks are molded into a cylindrical glass flask or into square shaped prism shaped aluminum molds. The technique using cylindrical bottles is easier to produce and gives more uniform samples. However, handling of cylindrical samples is less convenient for characterization and vials, unlike aluminum molds can not be used several times. The molds are then placed in an oven at 75° C. for a polymerization of about 24 hours (see appendix 1).

Demoulded samples are cut into a sheet of about 3 mm using a saw with a rotating diamond blade. Thereafter, the sheets (samples) are polished on a manual polishing table until a surface finish of about 1 μm is obtained.

Example of Manufacture of the Samples:

The manufacture of nano-emitting particles such as quantum dots, nanocrystals or the like is known to the person skilled in the art. For example, reference may be made to the following articles, the contents of which are hereby incorporated by reference:

Marie-Eve Lecavalier et al. "Water-dispersable colloidal quantum dots for the detection of ionizing radiation", Chem. Commun., 2013, 49, 11629-11631;

C. B. Murray, Synthesis and characterization of nearly monodisperse CdE (E=sulfur, selenium, tellurium) semiconductor nanocrystallites; J. Am. Chem. Soc., 1993, 115 (19), pp 8706-8715;

Sam Beddar, Luc Beaulieu; "Scintillation Dosimetry", Chapter 19 (ISBN 9781482208993).

The particular additives used are commercially obtained:

Carbon nanotubes—Supplier: Raymor Nanotech <http://raymor.com/nanotech/>, Product #: RN-02, Description: Carbon nanotube,>50% C-SWNT;

Silver nanoparticles—Supplier: Sigma-Aldrich <http://www.sigmaaldrich.com/canada-english.html>, Product #576832, Description: Silver nanopowder, <100 nm particle size.

The steps of making the samples may be as follows:
Heating water in a large crystallizer at 90° C. (with an agitator);
Preparing the liquid mixture of MMA (volatile), metallic addition, quantum dots and place it in a vial;
Weighing the polymerization initiator and add it to the liquid mixture;
Pluging the vial cap and shake until the mixture is clear;
Tightening the vial into universal pliers to immerse it into the crystallizer at 90° C.;
Starting the warm-up countdown;
When the preheating time has elapsed, removing the vial from the crystallizer;
Opening the cap to let the gas escape;
Closing the cap securely;
Placing the vial in a small beaker filled with water; and
Placing the beaker in an oven at 75° C. for one day.

The samples can be cut in the following way:
Removing the hood panels;
Removing the cap from the container of the saw;
Passing the blade of the saw on a sharpening block if necessary;
Securing the sample in the vice;
Adjusting the saw and the trolley with the aid of the deferent degrees of freedom;
Securing the truck to the rail;
Adjusting the speed of the blade;
Sprinkling the blade with a pear throughout the cut;
Manually guiding the saw to the sample and letting it cut;
Stopping the saw when cutting is complete and unpluging it; and
Rinsing the receptacle of the saw and replacing the panels of the hood.

The polishing of the samples can be carried out as follows:
Opening the water valves at the laboratory entrance (tap parallel to the pipe);
Laying an abrasive paper on the polishing plate (start with 600 grit);
Starting water to soak paper;
Placing the base around the paper to fix it;
Starting the turntable;
Adjusting the flow of water;
Placing the sample on the turntable taking care to place the cutting lines perpendicular to the radius of the table;
Holding the sample in place until the cutting lines have disappeared;
Heating the sample holder on the hot plate with a little paraffin;
When the paraffin is melted, placing the sample holder in a water bath and placing the polished face sample at 600 to the sample holder;
When the wax has solidified, insert the sample holder into the hollow cylinder;
Polishing this face using 600 papers, then 800, then 1200;
Using the same technique, fix the sample again on the sample holder, but with the other face facing upwards;—Polish this face using 600 papers, then 800, then 1200;
Removing the sample from the sample holder;

Placing a polishing pad on the polisher and pourring a few drops of cerium abrasive solution onto the carpet;

Adding a little water if necessary;

Polishing both sides; and

Rinsing the sandpaper, the polishing pad and washing the polisher.

Characterization Assembly

Figure 3:
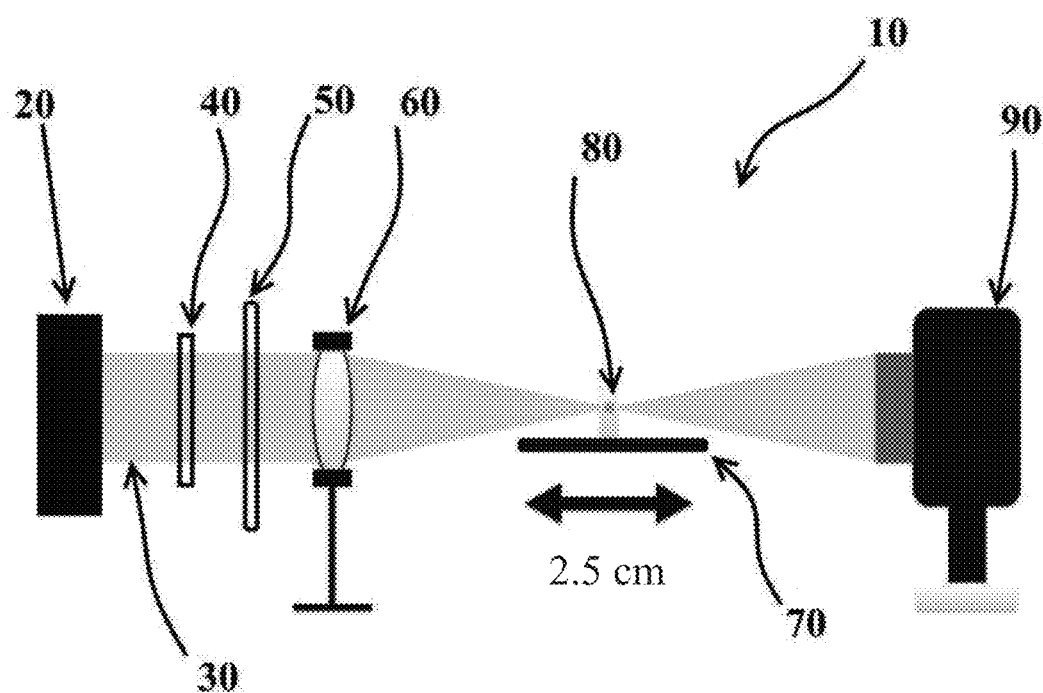
FIG. 3 illustrates a clean installation of a Z-Scan type laser with the parameters used during the experiment.

The Z-Scan technique does not require much material to be made. Referring to FIG. 3, the characterization circuit (10) consists only of the pulsed Reg-A laser (20) at the beginning of the path which emits infrared light ($\lambda$=788 nm) (30) to be oriented towards the optical table, attenuating filters (50), a focussing lens (60) for example of 30 cm, a rail surmounted by the sample holder of the beam profiler (90). The output power of the laser is about 500 mW, the average pulse duration is approximately 100 fs and the laser frequency is 10 kHz. It is necessary to attenuate the signal so as not to burn the sample or damage the beam profiler. A diagram of the assembly, without the filters, is shown in FIG. 3 to simulate the movement of the sample through the focal point.

Experimental Results:

TABLE 1

Sample series:

| Sample numbers | Concentrations of quantum dots (µl/ml) | Concentrations of silver nanoparticules (mg/ml) | Concentrations of carbon nanotubes (mg/ml) | Thickness (mm) ± 0.05 |
|---|---|---|---|---|
| 60 | 2.5 | 0 | 0 | 2.82 |
| 61 | 2.5 | 0.0195 | 0 | 2.80 |
| 62 | 2.5 | 0 | 0.0025 | 2.99 |
| 63 | 7.5 | 0 | 0 | 2.98 |
| 64 | 7.5 | 0.1005 | 0 | 4.03 |
| 65 | 7.5 | 0 | 0.00075 | 3.05 |

For each sample the preheating time is 15 minutes, the polymerization initiator mass is 4 mg and it should be noted that the samples contain 4 ml of solution and are supplemented with filtered MMA.

A series of graphs constructed using the Z-Scans is presented in FIGS. 4 to 8. Some graphics were omitted as they were too noisy or because the samples had been damaged by the laser during Z-Scan. The axes of the graphs are not graded. The abscissa axis shows the displacement on the translation axis of the sample during its Z-Scan. However, the only reliable point is the focal point (about the minimum of the curves) since the Wink software was started manually, not necessarily at the same time for each sample. As for the ordinate axis, it is the average intensity of light in arbitrary unit. The curves are all brought to the same scale in x and j for comparative purposes: for analysis, only the relative we are interested.

The curves have therefore been aligned with respect to their left tray (ie from 0 mm to the focal point) and with respect to their minimum.

The red curves (R) are those with only quantum dots (QD). The blue curves (B) are those with quantum dots and silver nanoparticles (QD+Ag). The purple curves (P) are those with quantum dots and carbon nanotubes (QD+CN).

TABLE 2

Relative depths of troughs relative to sample curve containing only quantum dots for both series.

| | Serie 1 (60, 61, 62) | | | Serie 2 (63, 64, 65) | |
|---|---|---|---|---|---|
| | 10 mV | 13.5 mV | 20 mV | 20 mV | 24 mV |
| QD (R) | 1 | 1 | 1 | 1 | 1 |
| QD + Ag (B) | 0.49 | 0.53 | 1.93 | 2.91 | 3.51 |
| QD + NC (P) | 1.3 | 1.02 | 1.06 | 0.93 | 0.54 |

TABLEAU 3

Sample fluorescence threshold

| Sample number | Fluorescence threshold (mW) ± 0.3 |
|---|---|
| 60 | 2.1 |
| 61 | 2.2 |
| 62 | 2.1 |
| 63 | 1.2 |
| 64 | 1.3 |
| 65 | 1.3 |

Comments on the Results—Causes of Bias:

To begin with, in the block manufacturing step, the main problem still to be improved is the homogeneity of the samples. After the preheating step, the flasks are agitated vigorously to promote even distribution in the space of the particles. However, upon heating in the oven, quantum dots tend to rise upward, making the first layer of the cylinder more concentrated in quantum dots. To overcome this effect, when cutting the samples, the first more concentrated layer is discarded. The second problem related to the homogeneity of the samples is the sedimentation of the silver nanoparticles and the agglomeration of the carbon nanotubes. Indeed, the silver nanoparticles tend to be deposited in the bottom of the vial. Again, cutting the samples partially corrects this effect. As for the carbon nanotubes that agglomerate, no solution has been adopted. Finally, the polishing step does not make it possible to erase all the irregularities of the material. In doing so, from one sample to the other there may be differences on the relief of the two faces. These irregularities were visible on the images generated by the beam profiler. We therefore fixed the sample on a removable base with a degree of freedom perpendicular to the displacement of the rail. It was then possible to move the specimen when the laser crossed an area that seemed less flat.

A second problem has been fixed using this removable base. When the samples are subjected to excessive power, they suffer irreversible damage to the affected point and the surrounding area. However, several Z-Scans were made on the same sample. In order to be able to perform the test on a different place of the sample, it was moved laterally using the base. It is important to note that around the focal point, the laser profile occupies approximately 1/100 of the sample, thus allowing this correction procedure. In FIG. 1, it is possible to see, in several places on the image, small concentric circles resembling diffraction patterns. These are dusts on some of the elements of the optical assembly. It is assumed that the dust on the camera lens does not influence the results too much since they are the same for each of the samples. However, when processing data, the sections chosen for the analysis are not all exactly the same location on the different images. The impact of each dust is therefore not identical to each image. In addition, the filters chosen to protect the beam profiler were not always the same. The filter dusts were therefore not equally distributed for each sample.

The camera software allows capturing the image of the beam profile in real time. Images are recorded using Wink software that captures 35 frames per second. This technique is very handy to make a link between what is visible on the screen and the quantitative values of light intensity. However, the fluctuations of the laser due to its intermittent instability can not be corrected. It is therefore difficult to distinguish between a fluctuation of the laser and a non-linear effect, since the latter have similar amplitudes. When interpreting the results, it is possible to circumvent this effect by knowing approximately where on the recording the focal point is located.

The selection of the area of interest on the ImageJ software could cause a bias because the section is not identical for each sample. An area of interest of identical size would not be functional, since from one measurement to the other the profile of the laser beam is changing. However, I did an audit check by comparing several areas to see how little impact the selection made as far as it was reasonable.

When interpreting the results, it is difficult to distinguish the difference between a hollow due to a non-linear effect and an alteration of the material. Indeed, looking at the graphs of FIGS. 6, 7 and 8 it is possible that the pronounced troughs are caused by the achievement of the damage threshold of the material and not by a non-linear effect. The samples containing the silver nanoparticles are those which generate the most important hollows at high power. The silver could linearly absorb light and re-emit it into heat, thereby altering the material more quickly and suggesting a larger non-linear effect. The plastic itself can not have caused damage to the sample since it does not absorb at the laser wavelength.

Figure 6:
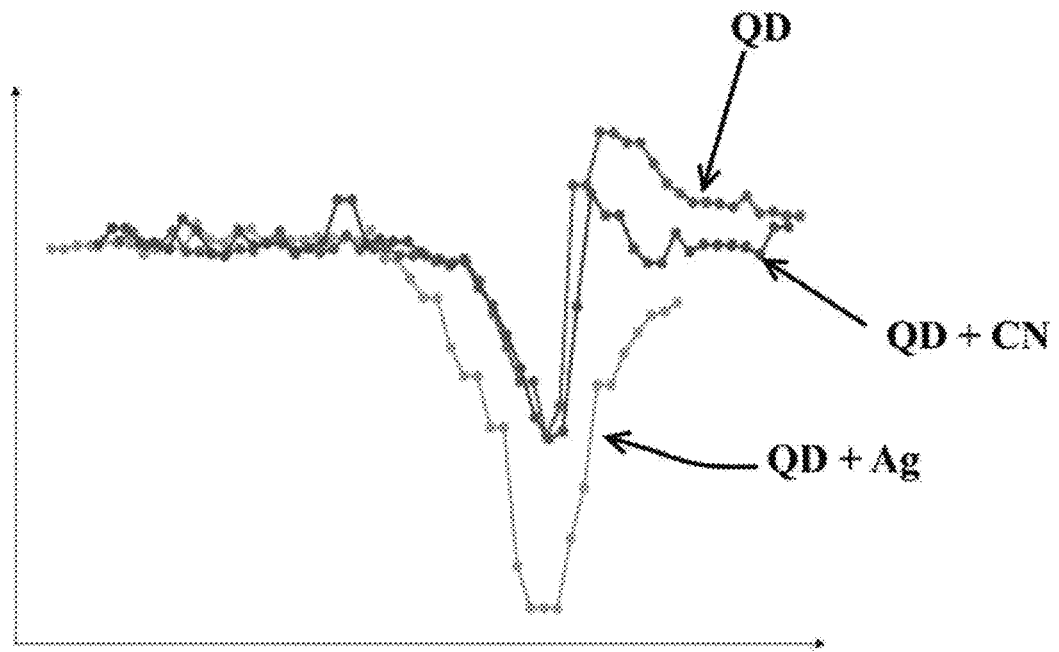
FIG. 6 is a graph showing the average intensity of the light as a function of the position of samples 60, 61 and 62 at a power of 20 mW (OD6).
Figure 7:
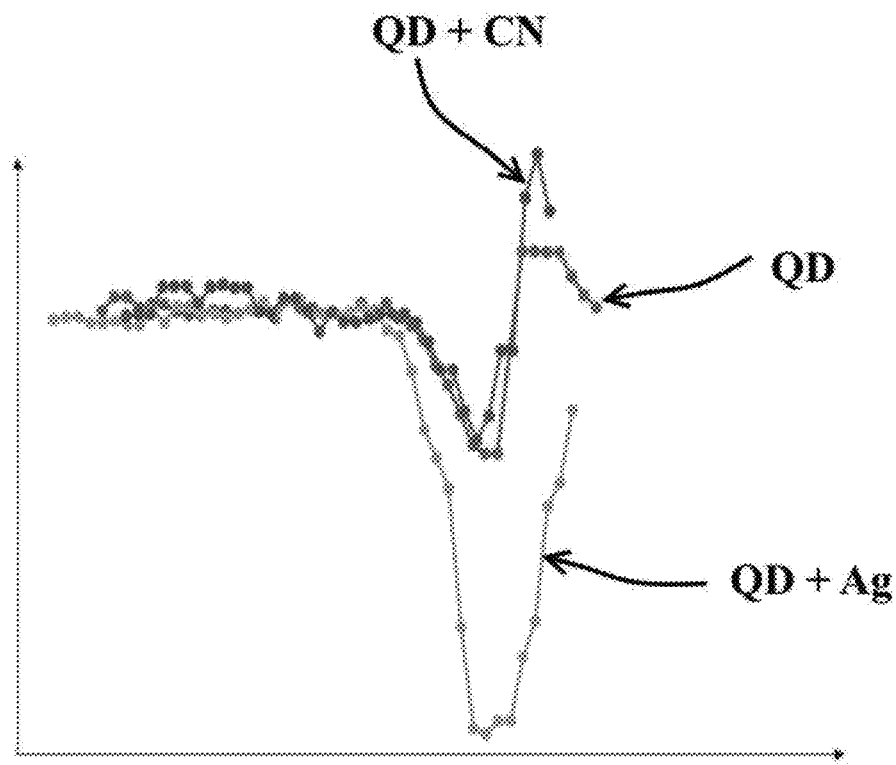
FIG. 7 is a graph showing the average intensity of the light as a function of the position of samples 63, 64 and 65 at a power of 20 mW (OD6).
Figure 8:
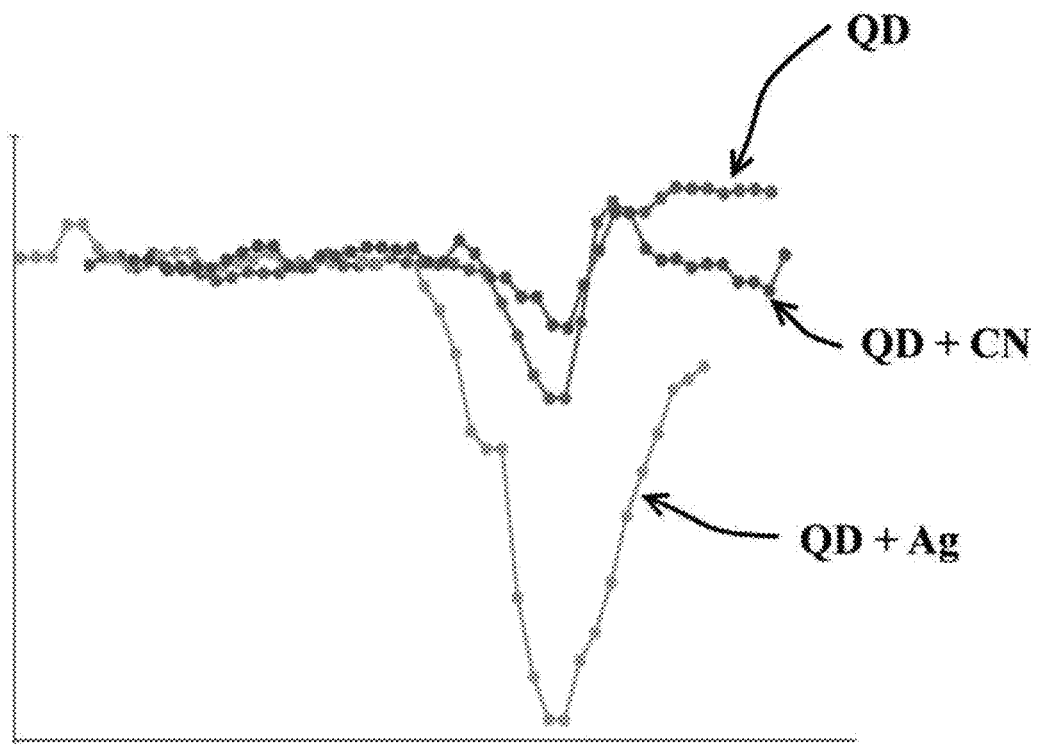
FIG. 8 is a graph showing the average light intensity as a function of the position of samples 63, 64 and 65 at a power of 24 mW (OD5).

Finally, the thickness of the blocks can not be taken into account by the method. Now, with reference to Table 1, it is noted that the samples are not exactly the same thickness. One specimen, the one containing the silver nanoparticles of series 2, is about 1 mm thicker. In the graphs of FIGS. 7 and 8, it is the one that generates the most important troughs. One might then think that the thickness is in question and that it is directly correlated with the nonlinear absorption. However, the silver curve in the graph of FIG. 6 also generates a large hollow whereas this sample is not thicker than the others. The ideal would still be to have similar thicknesses for each of the samples, but the polishing inserts a bias.

Analysis

As can be seen in Table 1, the series of samples 1 (60, 61, 62) has the same concentration of quantitative points in each of its elements. Same for series 2 (63, 64, 65), apart from the fact that it is uniformly more concentrated in quantum dots. It was chosen to do so in order to compare samples without metal and those containing them.

The graphs presented are a visual representation of the phenomenon of non-linear absorption. It is interesting to note that regardless of the power value, the samples containing the carbon nanotubes generate curves very similar to those of the quantum dots alone, thus suggesting no additional effect. The carbon nanotubes used in the samples were not completely metallic and it is likely that the aggregation of the particles blocked any effect. To summarize the five graphs in FIGS. 4 to 8, Table 2 shows the relative depth of the trough of each curve relative to the control sample (quantum dots only). Only the relative depth, that is to say measured with respect to the left tray of the graph, interests us since the parameters of the experiment made the work in absolute almost impossible. It should be noted that the rise of the plates after the passage to the focal point remains without explanation. However, the fact that the right-hand bearings are noisier than those on the left suggests that there has been damage to the material. When the sample moved on the rail in the opposite direction to its trajectory drawn on the graphs, the left-hand bearing was the upper one. In other words, the intensity of the light was always lower from the 0 mm position at the focal point and always higher from the focal point to the 25 mm position.

Figure 4:
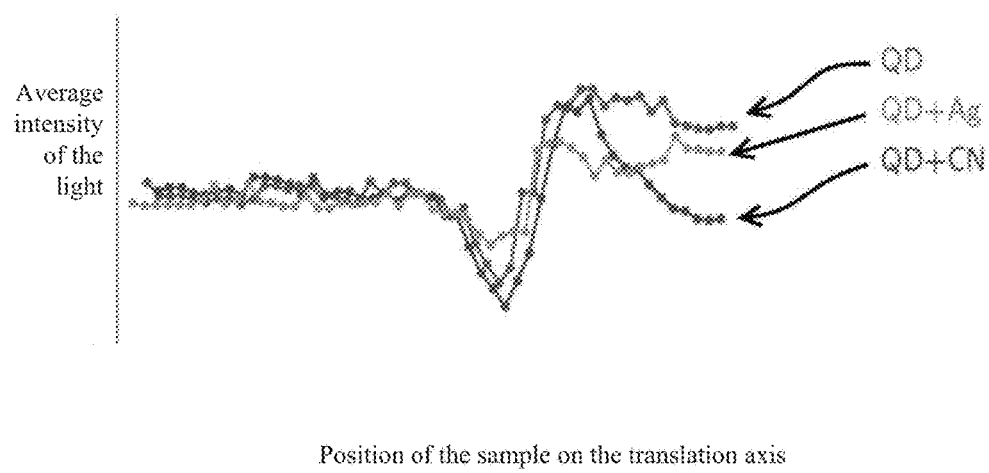
FIG. 4 is a graph showing the average intensity of the light as a function of the position of samples 60, 61 and 62 at a power of 10 mW (OD10).
Figure 5:
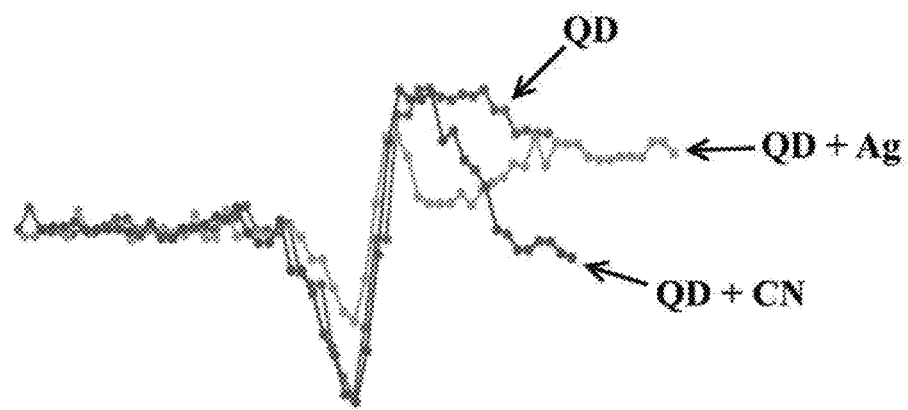
FIG. 5 is a graph showing the average light intensity as a function of the position of samples 60, 61 and 62 at a power of 13.5 mW (OD8).

In the graphs of FIGS. 4 and 5, or at relatively low powers, it can be seen that the sample containing the silver nanoparticles generates shallower depressions. Based on Table 2, it is noted that the relative depth of the troughs of the samples containing the silver is half the size of the troughs of the quantum dots alone. There is nevertheless presence of two-photon absorption at these powers since the hollows remain visible on the graphs. However, in the graphs of FIGS. 6 to 8, or at relatively high powers, the opposite effect is noted. It is the samples containing the silver nanoparticles that obtain relative depths being up to three and a half times more intense than the control.

Finally, based on Table 3, which shows the fluorescence threshold of the samples measured with the naked eye, it is quickly concluded that for a given concentration of quantum dots, the fluorescence threshold is the same.

In the light of all these observations, it is possible to suggest that the presence of silver nanoparticles has any effect on the properties of the material. However, since the fluorescence thresholds are similar for each of the samples and if the non-linear absorption effect was actually amplified by the silver nanoparticles, it would also be at low power provided there is absorption at two photons, it is common to think that the deeper troughs in the graphs in FIGS. 6-8 are due to damage to the material. This damage could constitute an interesting practical application, enabling engravings to be written in PMMA at a lower power. For example, according to the experimental parameters of graph 3 (FIG. 6), for a given power of 20 mW, only the sample containing the silver was engraved. However, independently of the interpretation of the results, it is likely that by changing the concentrations and refining the experimental technique to be able to observe increased effects in the presence of metal additions. The concentration of these metal additions influences the interparticle distance. Thus, this parameter could be the key to increase non-linear absorption whether for carbon nanotubes or silver nanoparticles. Moreover, it is not excluded that the phenomenon of non-linear absorption could be increased by the presence of silver nanoparticles only from a certain power threshold.

To improve the process, it would be advantageous to be able to measure the fluctuations of the laser by means of a partial deflection of the beam towards a photodiode making it possible to choose adequately the measurement periods. Moreover, it would be advantageous to develop a way of synchronizing the displacement rail with the measurement software so that all the curves have exactly the same displacement as a function of time, thus standardizing the abscissa axis.

Although the significant effect created by the samples containing the visible silver nanoparticles in FIGS. 3, 4 and 5 is not an increase in non-linear absorption, it appears that an effect is present. Other measurements and the manufacture of new series of samples could help to highlight the nature of this phenomenon.

Volumetric Production System

We describe hereafter experiments carried out to obtain a two-photon photoluminescence in matrices of PMMA (plexiglass) doped with quantum dots. We also establish functional requirements for a projection system and the steps required to implement the volumetric projection system.

Test Results

Figure 9A:
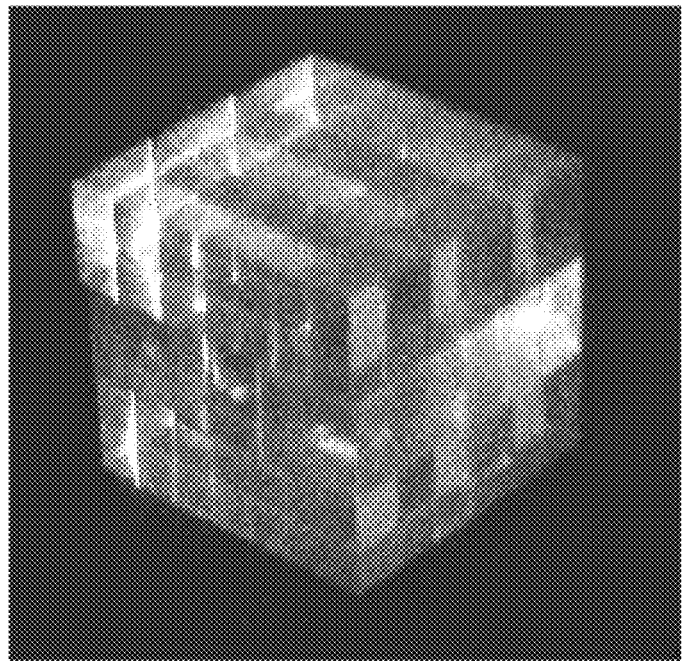
FIG. 9 shows a cube arrangement of a plurality of PMMA doped dots with non-illuminated quantum dots (FIG. 9A) and illuminated by a UV light beam (FIG. 9B).
Figure 9B:
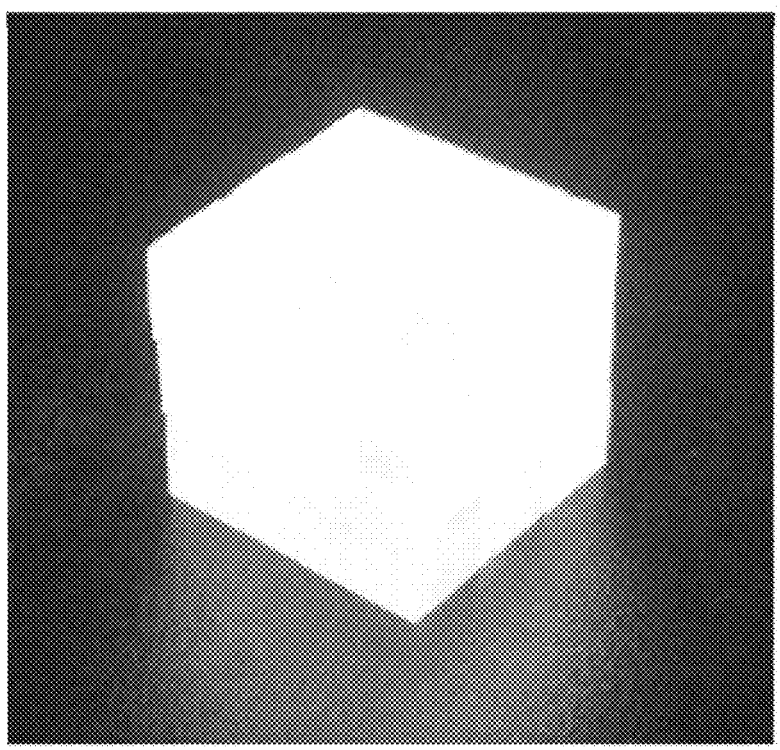

The first step was to introduce quantum dots in a PMMA. We have thus produced PMMA doped with quantum dots according to the process described here. FIG. 9 shows the arrangement of several capped PMMA strips (FIG. 9A) and the same arrangement excited by UV light (FIG. 9B). UV excitation shows the presence of photoluminescence, which is due to the presence of quantum dots in the PMMA.

The second step consisted in obtaining photoluminescence not from UV light but rather with infrared (IR) light via a two-photon absorption process. First, the results with the first laser YAG (1064 nm) continuously were disappointing. Indeed, PMMA began to melt at a certain intensity without producing photoluminescence. Using a pulsed YAG laser (5-7 ns) at a frequency of 10 Hz, we observed photoluminescence, but here again the PMMA was damaged.

In a third step, we used a Titanium-Sapphire laser with the following specifications:

TABLE 4

| | |
|---|---|
| Wave length | 789 nm |
| Repetition rate | 250 kHz |
| Pulse width | 82 femtosecondes |
| Minimum average power | <10 mW |

We also used a microscope lens to focus the light. The specifications of the objective are as follows:

TABLE 5

| | |
|---|---|
| Magnification | 5x |
| Focal length | 25 mm |
| Digital opening | 0.1 |
| Input pupil | 9 mm |

In all the following tests, photoluminescence is observable only at the focal point of the laser, there is no luminescent trail before or after the focal point. At a minimum average power, for example <10 mW, in static mode (no scan), the beam damages the sample, but photoluminescence is observed. The minimum intensity required (threshold) in static mode can not be found with these tests since photoluminescence is already observed. Subsequent tests with neutral filters should be made to determine the lower limit of the intensity required for photoluminescence.

Still at minimum power, for example <10 mW, but by moving the beam at a speed of 1 mm/s, photoluminescence is observed and there is no permanent damage to the PMMA.

By always moving at 1 mm/s, it is possible to increase the power up to about 35 mW of average power before seeing permanent damage. It is possible to increase the power >50 mW, and observe no damage if the scanning speed is increased by more than 1 mm/s.

Some damage may be due to the thermal effects induced by the short pulse laser. Permanent damage etched in the PMMA was measured with a microscope and was 35 microns wide. Thermal effects and non-linear effects should not be confused. Indeed, the thermal effects accumulate to produce a heating of the plastic and produce permanent defects. Non-linear effects or photoluminescence is produced locally and if and only if the beam intensity is sufficient. The photoluminescence zone is located at one location. This area or volume is defined by the intensity of the laser confinement at the focal point of the microscope objective.

Figure 10:
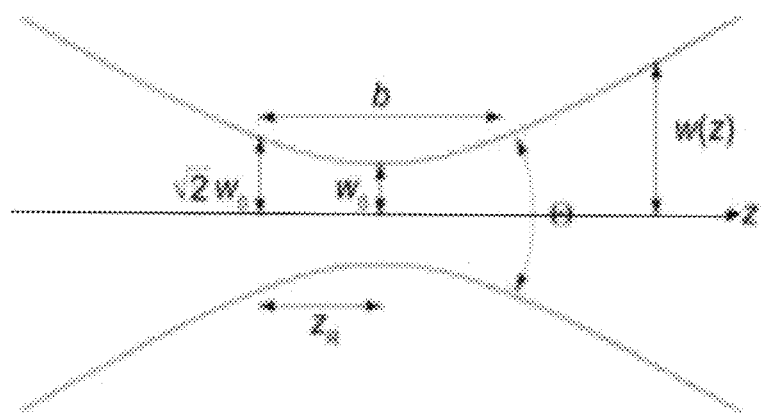
FIG. 10 illustrates a Gaussian laser beam around the focal area.

First, we hypothesize that the volume of the fluorescent zone is confined around the focal zone where the laser beam is confined. The axial distance is limited to the Rayleigh zone (b) and the transverse extent is limited by the "waist" ($W_0$) of the beam as illustrated in FIG. 10. These distances are defined by the following equations:

$$2Z_R = b = \frac{2\pi W_o^2}{\lambda}$$

$$2W_o = \frac{4\lambda}{\pi.\theta} = \frac{4\lambda}{\pi} F\#$$

According to these equations, the area of axial photoluminescence is greater than the lateral zone. By using the angle $\Theta$ to be equal to the inverse number-f (F#) of the focusing lens, we obtain a $W_0$ of:

$$2W_o = \frac{4\lambda}{\pi} * (fnumber) = \frac{4f\lambda}{\pi d} = \frac{4*25\ mm*789\ nm}{\pi(9\ mm)} = 2,79\ \text{microns}$$

For the axial dimension we have approximately 62 μm. This indicates that the fluorescent area should be very long.

However, we note that this is not the case. Several factors may explain this situation. It is possible that the PMMA matrix diffuses light, which increases the area we perceive by increasing the artificially size of the fluorescent zone. It is also possible that the fluorescent light emitted by the zone excited by the laser in turn excites quantum dots (1-photon excitation) which fluoresce, thereby increasing the size of the visible fluorescent zone. A combination of the two factors mentioned could also explain the situation. In any case, this situation requires that the coupling around the area excited by the laser (cross talk between the voxels) be examined in the future.

Example of Functional Requirement for the Projector

Based on the assumption that the volume of photoluminescence is confined to the focal zone, we can thus establish that to obtain a volume of cubic photoluminescence, it will be necessary to scan the voxel laterally on a dimension 'b'. This has the consequence that it will be preferentially necessary to have a mechanism for scanning the XY beam in order to "fill" the voxel. The scan could be done in raster scan as shown in FIG. 11 or via a circular scan which is simpler to integrate to the system.

Figure 11:
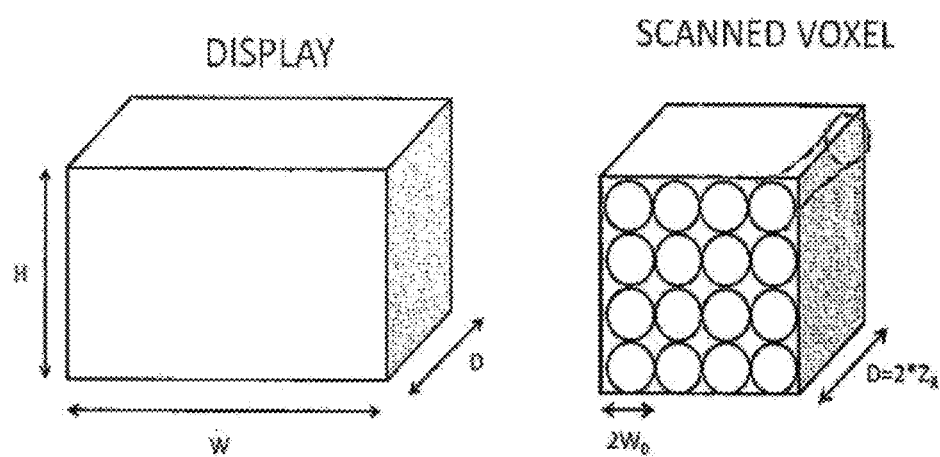
FIG. 11 is a diagram illustrating the geometry of the volume screen.

For a volume screen as illustrated in FIG. 11, we can define the dimension 'b' by determining the number of pixels in dimension D (depth). Knowing the wavelength of the laser (1), we can then determine the size $W_0$ of the required beam. The number of scanners N in the voxel (micro-scan) is given by the ratio $b/2W_0$ which is equal to 2F#. This F# approximately determines the required scanning lens of the system (scan lens).

Figure 12:
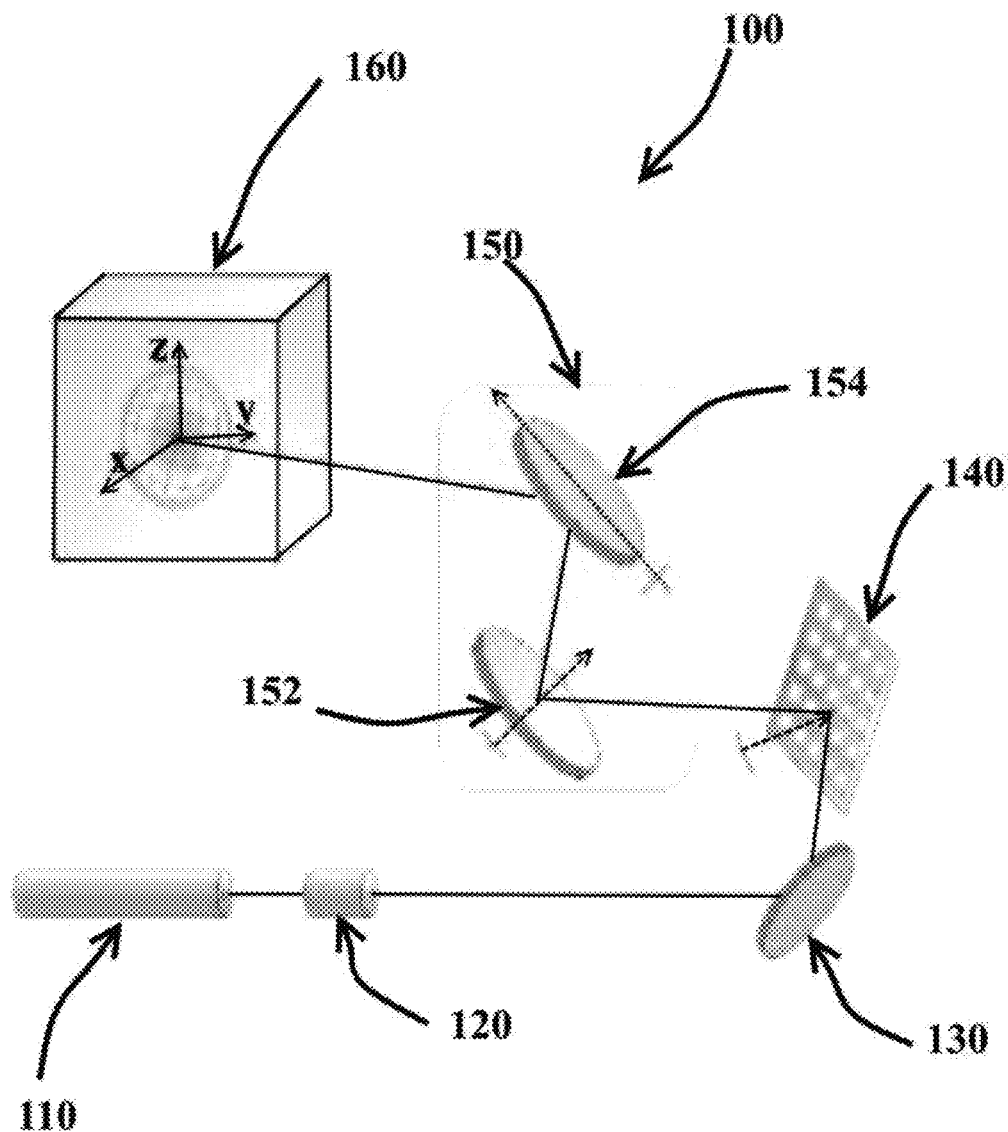
FIG. 12 illustrates a typical example of a laser scanning system.

Based on similar systems, the projection system is composed of 3 scanning subsystems. An X-Y scan which would position the focal point of the beam for each transverse plane of the image. This type of scanning would probably be done by two galvanometric mirrors. The second type of scan will be at depth (Z). For this axis it will probably be a liquid crystal space modulator (SLM) as shown in FIG. 12. As already mentioned, the last type of scan will be used to fill the voxel. This type of scanning can be done by a rotating prism but other types of scanning may be considered. The three-part scanning decoupling increases the total refresh rate of the system. The projection system (100) described in FIG. 12 comprises an IR-laser (110) projecting light onto a first modulator (120) and then to a light deflecting mirror (130) to the liquid crystal spatial modulator). On leaving the spatial modulator (140), the light is processed by the Y-Y scanner (150) and its galvanometer mirrors (152-154) before being projected onto the volume screen (160).

The scanning speed of the volume is one of the limiting criteria of the system in terms of the number of voxels that can be modulated at a rate of 30 frames per second. Based on a value of about 150 million voxels reachable in other 3D scanning system (HiResFELIX), we can pose as 3D system resolution of 500×500×500 voxels (equal to 125 million). From this resolution and the size of the system, it is possible to determine the size of the desired voxel, which sets the size of the rayleigh zone (ZR) which subsequently imposes a waist beam size ($2*W_0$) according to the equations described above. The number of micro-scans is calculated by dividing the area of the voxel by the size of the required beam waist. Finally, using the intensity values (Watts/mm$^2$) calculated for our tests with the Ti-Saphire laser and the area of the new beam waist required for the chosen display, we can determine the average power required laser for this new dimension of the required laser beam.

$$I_{moy} = \frac{P_{moy}}{Airefaisceau}$$

$$P_{moy} = I_{moy} * AireFaisceau = I_{moy} * \frac{\pi(2W_o)^2}{4}$$

The $I_{moy}=1.63e^{+3}$ Watt/mm$^2$ value required for photoluminescence was calculated from laboratory data ($P_{moy}=0.01$ W and $2W_0=2.79$ microns). This value is not necessarily the minimum and other values may be reached.

The distance between the scanning system and the display determines the focal length of the scanning lens. The f-number (f/#) is defined as the ratio between the focal length (f) and the diameter of a lens (D). $W_0$ is proportional to f# according to the following equation.

$$2W_o = \frac{4\lambda}{\pi} * f\# = \frac{4\lambda}{\pi} * \frac{f}{D}$$

With this equation, the size of the beam waist ($W_0$) and the focal length, we can determine the minimum diameter of the scanning lens. Finally, since the XY and Z scans are decoupled, the "XY scan" value gives the number of transverse points that need to be modulated to obtain a 30-second frame which directly gives the modulation and scanning frequency for the system.

Tables 6 and 7 below summarize the calculated parameters of a possible 3D projection system.

TABLE 6

| Minimum average intensity (W/mm$^2$) | | 1.63. 10$^3$ | |
| --- | --- | --- | --- |
| | W | H | D |
| Size of the display (m) | 1 | 1 | 1 |
| Number of voxels | | 125,000,000 | |

TABLE 6-continued

| Resolution (number of pixels) | 500 | 500 | 500 |
| --- | --- | --- | --- |
| Size of the Voxels (microns) | 2000 | 2000 | 2000 |
| $Z_R$: Required Zone of Rayleigh (μm) | | 2000 | |
| $2W_0$: required size of the beam (μm) | | 3.69 | |
| Number of scans/voxel | | 63.1 * 63.1 | |
| Average power (W) | | 1.291 | |

TABLE 7

| Scanning | |
| --- | --- |
| Distance laser - Display (m) | 0.5 |
| Focale Scan - Lens (?) | 0.5 |
| F-number (f/#) | 31.55 |
| Min. diameter scan lens (mm) | 15.85 |
| Scan XY: number dot/sec at 30 fps | 7,500,000 |
| Scan XY frequence modulation (MHz) | 7.5 |

The mean laser power calculated in the preceding Table 6 is 1.291 W which is quite high. In order to reduce the power, one can lay a volume of 50×50×50 cm which would reduce by half the required power. Another solution is to combine two lasers to produce the required intensity. Also, it should be kept in mind that the minimum light intensity requirements for photoluminescence have not been determined and therefore we use the minimum power of the test laser (10 mW) which produced luminescence in our tests. Moreover, these calculations are for a monochromatic system. An RGB color system could be preferably composed of a laminate of successive RGB layers which will decrease by 3 the required for ZR. The required power will also be cut by three in favor of an increase in Z-scanning speed by the SLM. FIG. 5 of the article Downing—"A Three-Color, Solid State, Three-Dimensional Display", Science, 1996, p 5279-1185 presents a concept of this type of laminated display.

Quantum dots can be used to generate nonlinear effects when subjected to high powers. To aspire to practical applications, it is preferable to imprison them in a solid structure rather than leaving them in solution where their toxic content would be more likely to be exposed to users. Consequently, quantum dots have been confined in a plastic matrix (such as polymethylmethacrylate). Carbon nanotubes and silver nanoparticles were joined to some of the samples. The objective was to be able to compare the two-photon absorption of the samples using a Z-Scan. This technique measures the intensity of light of the laser that passes through the sample as it travels through the focal point.

When the quantum dots were placed in the focused beam of the laser, it was possible to see orange fluorescence with the naked eye. Following the measurement, we observed that the presence of carbon nanotubes did not appear to affect non-linear absorption. However, we observed that the presence of silver nanoparticles could increase this effect up to four times. However, we also found that the material damage threshold was approximately 30 mW, while the fluorescence threshold was 2 mW. These two values being relatively close, the non-linear absorption and the damage of the material are difficult to distinguish.

Although it has been described with one or more preferred embodiments, it is to be understood that the present invention may be used, employed and/or embodied in a multitude of other forms. Thus, the claims which follow are to be interpreted so as to include these different forms while remaining outside the limits set by the prior art.

The invention claimed is:

1. A hybrid projection matrix, the matrix comprising a solid support transparent to light and a synergistic combination of at least two different types of particles inside of said solid support, wherein:
   a first type of particle is comprised of nano-emitting particles adapted to non-linearly absorb one or two photons and emit visible light; and
   a second type of particle is comprised of one or more additives enhancing the non-linear absorption of the one or two photons and the emission of light visible by the nano-emitting particles, wherein said one or more additives is selected from the group consisting of gold nanoparticles, silver nanoparticles, semiconductor nanoparticles, nanocellulose, carbon nanotubes, two-dimensional materials, graphene, conductive polymers and semi-conductive polymers.

2. The matrix according to claim 1, wherein the light-transparent solid support comprises a polymeric support.

3. The matrix according to claim 2, wherein the polymeric support comprises polymethylmethacrylate.

4. The matrix according to claim 1, wherein the nano-emitting particles comprise quantum dots, quantum wires or rods, quantum wells, quantum rings, nano-crystals, nano-plates, fluorescent molecules, fluorophores or phosphors.

5. The matrix according to claim 4, wherein the nanocrystals are core/shell nanocrystals or heterostructured nanocrystals.

6. The matrix according to claim 1, wherein the matrix is in a form of a sheet having a thickness of between 2 and 5 mm.

7. The matrix according to claim 6, wherein the sheet has a polished surface and has a finish of about 1 µm.

8. A three-dimensional (3D) imaging volumetric projection system, the system comprising:
   a photon emitting source; and
   the hybrid projection matrix as defined in claim 1, the matrix being located downstream of the emitting source in order to receive the photons from the emitting source, the matrix then emitting visible light in order to create a three-dimensional image.

9. The system according to claim 8, wherein the photon emitting source is a laser that emits invisible infrared light.

10. The system according to claim 9, wherein the laser produces an X-Y scan to position a focal point of the laser beam for each transverse plane of an image.

11. The system according to claim 9, wherein the laser produces a Z-scan for positioning a focal point of the laser beam for each depth plane of the image.

12. The system according to claim 9, wherein the laser produces a scan to fill a voxel.

13. The system according to claim 9, wherein the laser produces a decoupled three-part scan to increase a total refresh rate of the system, said scanning comprising:
   a first XY-scan for positioning a focal point of the beam for each transverse plane of an image;
   a second Z-scan for positioning a focal point of the beam for each depth plane of the image; and
   a third scan to complete an image and fill a voxel.

14. A method for three-dimensional (3D) imaging volumetric projection, the method consisting in projecting photons onto the hybrid projection matrix as defined in claim 1, the matrix then emitting visible light for forming a three-dimensional image.

15. The method according to claim 14, wherein the photons are infrared emitted by a laser.

16. The method according to claim 15, wherein the laser produces an XY-scan to position a focal point of the laser beam for each transverse plane of an image.

17. The method according to claim 15, wherein the laser produces a Z-scan to position a focal point of the laser beam for each depth plane of the image.

18. The method according to claim 15, wherein the laser produces a scan to fill a voxel.

19. The method according to claim 15, wherein the laser produces a decoupled scan in three portions to increase a total refresh rate of the system, said scanning comprising:
   a first XY-scan for positioning a focal point of the beam for each transverse plane of an image;
   a second Z-scan for positioning a focal point of the beam for each depth plane of the image; and
   a third scan to complete an image and fill a voxel.

20. A process for making a hybrid projection matrix for volumetric three-dimensional (3D) imaging projection, the process comprising the following steps:
   a) mixing in a solution allowing the synthesis of a solid support transparent to light, a first given amount of a first type of particles comprising nano-emitting particles and a second given quantity of a second type of particles comprising at least one additive; and
   b) solidifying the resulting mixture to obtain the matrix.

21. The process according to claim 20, wherein the solution for synthesizing the solid light-transparent support comprises a monomer which, once polymerized, forms a light-transmissive polymeric support.

22. The process according to claim 21, comprising the following steps:
   a1) mixing the monomer solution allowing the synthesis of the polymer support, the first given quantity of the first type of particles comprising the nano-emitting particles and the second given quantity of the second type of particles comprising said at least one additive;
   a2) inserting a polymerization initiator into the mixture; and
   b1) allowing the resulting mixture to polymerize to obtain the matrix.

23. The process according to claim 21, wherein the polymeric support comprises polymethylmethacrylate.

24. The process according to claim 20, wherein the nano-emitting particles comprise quantum dots, quantum wires or rods, quantum wells, quantum rings, nano-crystals, nanoplates, fluorescent molecules, fluorophores or phosphors.

25. The process according to claim 20, wherein said one or more additives is selected from the group consisting of gold nanoparticles, silver nanoparticles, semiconductor nanoparticles, nanocellulose, carbon nanotubes, two-dimensional materials, graphene, conductive polymers and semi-conductive polymers.

26. The process according to claim 22, wherein the matrix is obtained from a solution of quantum dots having a quantum dot concentration of between 2 µl/ml and 8 µl/ml, and a silver nanoparticle solution having a concentration of silver nanoparticles between 0.01 mg/ml and 0.2 mg/ml.

27. The process according to claim 23, wherein the matrix is obtained from a solution of quantum dots having a quantum dot concentration of between 2 µl ml and 8 µl/ml, and a solution of carbon nanotubes having a concentration of carbon nanoparticles of between 0.0001 mg/ml and 0.01 mg/ml.

28. The process according to claim 21, the process further comprising the step of cutting the matrix obtained after polymerization in the form of parallel sheets/slides and selecting adjacent slides to obtain similar concentrations of nanoparticles in each of the selected slides.

* * * * *